US008822558B2

(12) United States Patent
Gawryla et al.

(10) Patent No.: US 8,822,558 B2
(45) Date of Patent: Sep. 2, 2014

(54) LOW DENSITY HYDROPHOBIC MATERIAL AND METHOD OF MAKING THE SAME

(75) Inventors: Matthew D. Gawryla, Chagrin Falls, OH (US); David A. Schiraldi, Shaker Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 252 days.

(21) Appl. No.: 13/377,581

(22) PCT Filed: Jun. 11, 2010

(86) PCT No.: PCT/US2010/038316
§ 371 (c)(1),
(2), (4) Date: Dec. 12, 2011

(87) PCT Pub. No.: WO2010/144802
PCT Pub. Date: Dec. 16, 2010

(65) Prior Publication Data
US 2012/0088855 A1    Apr. 12, 2012

Related U.S. Application Data

(60) Provisional application No. 61/268,335, filed on Jun. 11, 2009.

(51) Int. Cl.
| C08J 9/28 | (2006.01) |
| C08G 73/10 | (2006.01) |
| C08G 69/44 | (2006.01) |
| C08J 3/00 | (2006.01) |
| C08J 9/32 | (2006.01) |
| B01J 13/00 | (2006.01) |
| C09K 3/32 | (2006.01) |

(52) U.S. Cl.
CPC ........ *B01J 13/0091* (2013.01); *C08J 2205/026* (2013.01); *C08J 9/32* (2013.01); *C08J 2379/08* (2013.01); *C09K 3/32* (2013.01)
USPC .............................. 521/184; 521/64; 524/455

(58) Field of Classification Search
CPC .................................................. B01J 13/0091
USPC ................. 521/90, 91, 182, 184, 64; 524/445
See application file for complete search history.

(56) References Cited

U.S. PATENT DOCUMENTS

| 2,093,454 A | 9/1937 | Kistler |
| 3,188,264 A | 6/1965 | Holden |
| 3,203,903 A | 8/1965 | van Olphen |
| 4,925,603 A | 5/1990 | Nambu |
| 5,176,108 A | 1/1993 | Jenkins et al. |
| 5,214,012 A | 5/1993 | Suzuki et al. |
| 5,347,950 A | 9/1994 | Kasbo et al. |
| 5,503,111 A | 4/1996 | Hughes |
| 5,526,771 A | 6/1996 | Ito |
| 5,622,693 A | 4/1997 | Funatsu |
| 5,801,116 A | 9/1998 | Cottrell et al. |
| 5,975,019 A | 11/1999 | Goss et al. |
| 5,992,351 A | 11/1999 | Jenkins |
| 6,013,391 A | 1/2000 | Le et al. |
| 6,027,795 A | 2/2000 | Kabra et al. |
| 6,083,619 A | 7/2000 | Frank et al. |
| 6,262,162 B1 | 7/2001 | Lan et al. |
| 6,287,550 B1 | 9/2001 | Trinh et al. |
| 6,811,602 B2 | 11/2004 | Beppu et al. |
| 6,863,924 B2 | 3/2005 | Ranganathan et al. |
| 6,887,570 B2 | 5/2005 | Greene et al. |
| 7,119,137 B2 | 10/2006 | Darlington et al. |
| 7,544,720 B2 | 6/2009 | Cooper et al. |
| 7,691,911 B2 | 4/2010 | Lee et al. |
| 2004/0033352 A1 | 2/2004 | Massa et al. |
| 2004/0132846 A1 | 7/2004 | Leventis |
| 2004/0173536 A1 | 9/2004 | Coronado et al. |
| 2005/0005869 A1 | 1/2005 | Fritter et al. |
| 2005/0146066 A1 | 7/2005 | Koide et al. |
| 2005/0175577 A1 | 8/2005 | Jenkins et al. |
| 2005/0266992 A1 | 12/2005 | Ohno et al. |
| 2006/0211840 A1 | 9/2006 | Lee |
| 2007/0208124 A1 | 9/2007 | Schiraldi et al. |
| 2008/0132632 A1* | 6/2008 | Schiraldi et al. .............. 524/445 |
| 2009/0035344 A1 | 2/2009 | Thomas et al. |

FOREIGN PATENT DOCUMENTS

| GB | 1 313 091 | 4/1973 |
| JP | 63159269 A | 7/1988 |
| JP | 09238588 A | 9/1997 |
| JP | 11079860 A | 3/1999 |
| JP | 11188253 A | 7/1999 |
| JP | 11347401 A | 12/1999 |

(Continued)

OTHER PUBLICATIONS

International Search Report and the Written Opinion for International Application No. PCT/US2010/038470 mailed Feb. 15, 2011 corresponding to copending U.S. Appl. No. 13/377,574.
Nishihara et al., "Preparation of resorcinol-formaldehyde carbon cryogel microhoneycombs", Letters to the Editor, Carbon 42, 2004, pp. 889-901.
Wang et al., "Comparison of porous poly (vinyl alcohol)/hydroxyapatite composite cryogels and cryogels immobilized on poly (vinyl alcohol) and polyurethane foams for removal of cadmium", Journal of Hazardous Materials, vol. 156, 2008, pp. 381-386.
Kathuria et al., "Synthesis and characterization of elastic and macroporous chitosan-gelatin cryogels for tissue engineering", Acta Biomaterialia, vol. 5, 2009, pp. 406-418.
Petrov et al., "Synthesis of biodegradable hydroxyethylcellulose cryogels by UV irradiation", Polymer 48, 2007, pp. 4943-4949.

(Continued)

*Primary Examiner* — Kara Boyle
(74) *Attorney, Agent, or Firm* — Renner, Otto, Boisselle & Sklar, LLP

(57) ABSTRACT

Low density, buoyant materials, in particular hydrophobic aerogels, may be used to absorb hydrophobic liquids. The materials are adapted to float on aqueous solutions and can absorb oils or other hydrophobic liquids from the surface of the solution without absorbing appreciable amounts of the aqueous solution. Methods for creating and using the materials are disclosed.

14 Claims, No Drawings

(56) References Cited

FOREIGN PATENT DOCUMENTS

| | | |
|---|---|---|
| JP | 2000-154273 | 6/2000 |
| JP | 2006-037095 | 2/2006 |
| JP | 2006-182853 | 7/2006 |
| JP | 2007-100035 | 4/2007 |
| KR | 2008 093 772 A | 10/2008 |
| WO | 03/093197 | 11/2003 |
| WO | 2004/087285 | 10/2004 |
| WO | 2008/121069 | 10/2008 |
| WO | 2010/029517 | 3/2010 |
| WO | 2010/144803 | 12/2010 |
| WO | 2010/144807 | 12/2010 |
| WO | 2010/144896 | 12/2010 |
| WO | 2010/144899 | 12/2010 |

OTHER PUBLICATIONS

International Search Report and the Written Opinion for International Application No. PCT/US2010/038476 mailed Feb. 23, 2011 corresponding to copending U.S. Appl. No. 13/377,576.
Gawryla et al., "Anisotropic clay Aerogel Composite Materials", Materials Research Society Symp. Proc., vol. 1188, 2009, 6 pages.
Materials Research Society, MRS Meeting Archives—2009 Spring Meeting—Symposium LL: Architectured Multifunctional Materials, 2009, 7 pages.
Hostler et al., "Thermal conductivity of a clay-based aerogel", International Journal of Heat and Mass Transfer, vol. 52, 2009, pp. 665-669.
Nishihara et al., "Preparation of titania-silica cryogels with controlled shapes and photocatalysis through unidirectional freezing", Materials Letters, vol. 64, 2010, pp. 959-961.
International Search Report and the Written Opinion for International Application No. PCT/US2010/038323 mailed Feb. 18, 2011 corresponding to copending U.S. Appl. No. 13/377,577.
Gawryla et al., "Clay aerogel/cellulose whisker nanocomposites: a nanoscale wattle and daub", Journal of Materials Chemistry, vol. 19, 2009, pp. 2118-2124.
Pojanavaraphan et al., "Prevulcanized natural rubber latex/clay aerogel nanocomposites", European Polymer Journal, vol. 44, 2008, pp. 1968-1977.
Finlay et al., "Biologically Based Fiber-Reinforced/Clay Aerogel Composites", Ind. Eng. Chem. Res., vol. 47, 2007, pp. 615-619.
Griebel et al., "Clay aerogel supported metallic nanoparticles for the purpose of liquid and gas phase hydrogenation", Internet http://filer.case.edu/users/jjg34/Preprint%20ACS%_20Spring%202009.pdf, 2008, 2 pages.
Griebel et al., "Clay Aerogel Supported Palladium Nanoparticles as Catalysts", Internet http://filer.case.edu/users/jjg34/Jared%20Catalyst%20Paper%20Version@206.1_PDF.pdf,, 2008, 10 pages.
Somlai et al., "Facile Processing of Clays into Organically-Modified Aerogels", American Institute of Chemical Engineers, vol. 52, 2006, pp. 1162-1168.
International Preliminary Report on Patentability for International Application No. PCT/US2010/038323 mailed Aug. 10, 2011 corresponding to copending U.S. Appl. No. 13/377,577.
International Search Report and the Written Opinion for International Application No. PCT/US2010/038317 mailed Feb. 24, 2011 corresponding to copending U.S. Appl. No. 13/377,580.
International Search Report and the Written Opinion for corresponding International Application No. PCT/US2010/038316 mailed Oct. 25, 2010.
Jeon et al., "Method for preparing permanently hydrophobic aerogel powder with increased particle size and density", Chemical Abstracts Service, 2008, 1 page.
Paakko et al., "Long and entangles native cellulose I nanofibers allow flexible aerogels and hierarchically porous templates for functionalities", Soft Matter, vol. 4, 2008, pp. 2492-2499.

Mitsutoshi et al., "Preparation of aromatic polyamide aerogels by supercritical fluid extraction with carbon dioxide", Internet http://sciencelinks.jp/j-east/article/200212/_000020021202A0213691.php, 2001, 1 page.
Reynolds et al., "Hydrophobic aerogels for oil-spill clean up—synthesis and characterization", Journal of Non-Crystalline Solids, vol. 292, 2001, pp. 127-137.
Ikkala et al., "Solid state nanofibers based on self-assemblies: from cleaving from self-assemblies to multilevel hierarchical constructs", Faraday Discussions, vol. 143, 2009, pp. 95-107.
International Preliminary Report on Patentability for corresponding International Application No. PCT/US2010/038316 mailed Sep. 27, 2011.
Tsuda et al., "A hairpin-loop conformation in tandem repeat sequence of the ice nucleation protein revealed by NMR spectroscopy", FEBS Letters 409, 1997, pp. 227-231.
Graether et al., "Modeling *Pseudomonas syringae* Ice-Nucleation Protein as a β-Helical Protein", Biophysical Journal, vol. 80, 2001, pp. 1169-1173.
International Preliminary Report on Patentability for International Application No. PCT/US2010/038317 mailed Dec. 9, 2011, corresponding to copending U.S. Appl. No. 13/377,580.
International Preliminary Report on Patentability for International Application No. PCT/US2010/38476 mailed Dec. 9, 2011 corresponding to copending U.S. Appl. No. 13/377,576.
Miller et al., "Notes Random Powder Mounts From Montmorillonite Aerogels", Clay Minerals, 1070, 8, pp. 347-348.
Machine translated English equivalent of JP 11347401 A, 14 pages.
JP 63159269 A as abstracted by CAPlus (AN 1989:12491), 1 page.
Definition of freeze-drying, Hawley's Condensed Chemical Dictionary, 14$^{th}$ Edition, © 2002, John Wiley & Sons, Inc., 1 page.
Machine translated English equivalent of JP 11188253 A.
Abstract of Hsu, "Effect of Yam (*Dioscorea* alate Compared to*Dioscorea japonica*) on Gastrointestinal Function and Antioxidant Activity in Mice", Journal of Food Science, 2006, 71, S513-S516.
Machine translated English equivalent of JP 09238588 A.
Machine translated English equivalent of JP 11079860 A.
Kistler, "Coherent Expanded Aerogels", J. Phys. Chem. 1932; 36; pp. 52-64.
Mackenzie, "Clay-water Relations", Nature, 1952: 171; pp. 681-683.
Call, "Preparation of Dry Clay-Gels by Freeze-Drying", Nature 1953: 172; 126.
Weiss et al., "The Skeleton Structure in Thixotropic Gels", Naturwissenschaften 1952: 39; pp. 351-352.
Hoffman et al., "A Thixotropy in Kaolinite and Inner-Crystalline Swelling in Montmorillonite", Kolloid-Z, 1957; 151, pp. 97-115.
Norrish et al., "Effect of Freezing on the Swelling of Clay Minerals", Clay Miner, bulletin 1962; 5; pp. 9-16.
van Olphen, "Polyelectrolyte Reinforced Aerogels of Clays-Application as Chromatographic Adsorbents", Clay Miner, 1967; 15; pp. 423-345.
Nakazawa et al., "Texture Control of Clay-Aerogel through the Crystallization Process of Ice", Clay Science 1987; 6; pp. 269-276.
Schiraldi et al., "Facile Processing of Clays into Organically-Modified Aerogels", AICHE Journal 093002, Revised Sep. 1, 2005, pp. 1-27.
Schiraldi et al., "Temperature-Responsive Clay Aerogel Polymer composites", Presented at Case Western Reserve University, Sep. 9, 2005, pp. 1-19.
Schiraldi et al., "Clay Aerogel Nanocomposites, AeroClay", Clay Aerogel Business Proposal, Sep. 15, 2005, pp. 1-5.
Bandi et al., "Responsive Polymer/Clay Aerogel Composites", MRS 204 Presentation, Nov. 24, 2004, 1 page.
Schiraldi, "Clay Aerogel/Polymer Composites", Schiraldi Research Group, Case Western Reserve University, SPE Online, Sep. 28, 2005.
Schiraldi et al., "Polymer/Clay Aerogel Composites", American Chemical Society 228$^{th}$ National Meeting & Exposition, Aug. 22-26, 2004, Philadelphia, PA, p. 32.
Bandi et al., "Clay Aerogel Polymer Composites", American Chemical Society, Mar. 8, 2005, 26 pages.
Schiraldi, "Tailoring Polymer Properties Using Well-Designed Nanofillers", Presented at Ferro Corporation Meeting Mar. 29, 2005, 33 pages.

(56) References Cited

OTHER PUBLICATIONS

Schiraldi, "Clay Aerogel/Polymer Composites", presented at ANTEC, Boston, MA, May 4, 2005, 40 pages.
Schiraldi, "New Fillers for FR Plastics", presented at Delphi Packard Electric Meeting, Jun. 23, 2005, 30 pages.
Schiraldi, "Polymer/Aerogel Composites for Lightweighting Applications", presented to Honda, Aug. 2, 2005, 37 pages.
Schiraldi, "Case Aerogel Program", presented at NASA Meeting, Jul. 5, 2005, 28 pages.
International Preliminary Report on Patentability for International Application No. PCT/US2010/038470 mailed Nov. 14, 2011 corresponding to copending U.S. Appl. No. 13/377,574.
Gohil et al., "Studies on the Cross-linking of Poly(Vinyl Alcohol)", Journal of Polymer Research, No. 13, 2006, pp. 161-169.

* cited by examiner

LOW DENSITY HYDROPHOBIC MATERIAL AND METHOD OF MAKING THE SAME

This application is a national phase of International Application No. PCT/US2010/038316 filed Jun. 11, 2010 and published in the English language, which claims priority to U.S. 61/268,335 filed Jun. 11, 2009.

TECHNICAL FIELD

The present invention relates generally to aerogels and aerogel-like porous materials, and in particular, to hydrophobic aerogel compositions and composites, and methods of making the same.

BACKGROUND

Aqueous solutions such as water, salt water, coolants and various other fluids can become contaminated via spills, human error, mechanical breakdowns, etc. Some methods for removing hydrophobic liquids such as oil from aqueous solutions involve skimming the oil from the surface, pulling the oil and water from the surface into tanks via a vacuum system, and absorbing the oil in tow behind rope, in the case of large bodies of water.

SUMMARY

The present invention provides a novel composition that is buoyant and floats on the surface of an aqueous solution, absorbs hydrophobic liquids present on the surface of the aqueous solution, such as oil, and does so without significant absorption of the aqueous solution itself.

In one aspect, there is provided an aerogel composition that is hydrophobic in nature and has the ability to absorb hydrophobic liquids, generally at a high capacity.

In another aspect, there is provided an aerogel composition that absorbs hydrophobic liquids and maintains structural integrity.

In a further aspect, there is provided a method for making a hydrophobic liquid absorbing aerogel including the steps of providing a composition of a polymer, such as in the form of a dispersion or emulsion in a sublimable dispersion medium or solvent, freezing the composition and freeze-drying the composition to sublime the dispersion medium, thereby forming the aerogel. In one embodiment, the method further includes the step of heating the formed aerogel at a sufficient temperature for a sufficient period of time to create a cured aerogel having hydrophobic properties.

In one aspect, there is provided a method for utilizing an absorbent hydrophobic aerogel comprising the steps of placing the aerogel on an aqueous surface and allowing the aerogel to contact a hydrophobic compound present on the surface of the aqueous solution whereby the hydrophobic compound is absorbed by the aerogel, and subsequently removing the saturated aerogel from the aqueous solution. The hydrophobic compound absorbed by the aerogel may be recovered from the at least partially saturated aerogel by squeezing or pressing the aerogel to release the absorbed hydrophobic compound.

In one aspect, the hydrophobic liquid absorbing aerogel composition may be a porous aerogel that includes at least one hydrophilic polymer or a cured hydrophobic polymer or a combination thereof.

In a further aspect, a method for making a hydrophobic liquid absorbing aerogel includes the steps of providing a mixture that includes a dispersion medium and a hydrophobic polymer or derivative, freezing the mixture, and drying the mixture under vacuum to sublime the dispersion medium from the mixture, thereby producing a hydrophobic aerogel.

In one embodiment, the hydrophobic polymer of the hydrophobic aerogel includes a polyamide-imide. In another embodiment, the hydrophobic aerogel includes a polyimide. In yet another embodiment, the hydrophobic polymer is an emulsion polymerized hydrophobic polymer derived from a monomer system that includes at least one monomer chosen from styrene, acrylic acid ester, methacrylic acid ester, vinyl ester, vinyl halide, vinylidene halide and diene.

In one embodiment, a buoyant, oil absorbing material includes a hydrophobic polymer aerogel that includes hollow microspheres. The hydrophobic polymer aerogel may include clay. In one embodiment, the hydrophobic polymer aerogel is substantially free of clay.

In one aspect, a method of forming a hydrophobic aerogel includes the steps of providing a dispersion comprising a hydrophobic polymer or hydrophobic polymer precursor, and a dispersion medium; freezing the dispersion to solidify the dispersion medium; and freeze drying the dispersion to remove the dispersion medium to form an aerogel.

The hydrophobic polymer precursor of the dispersion may include a polymer material comprising a mixture of amide-amic acid units represented by the following structural formula A:

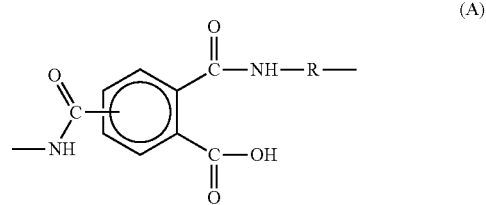

wherein the attachment of the two amide groups to the aromatic ring represent the 1,3 and the 1,4 polyamide-amic acid configurations, together with amide-imide units represented by the following structural formula B:

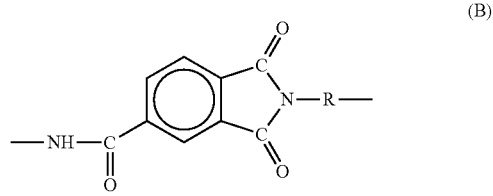

wherein R is a substituted or unsubstituted divalent arylene moiety selected from the group consisting of:

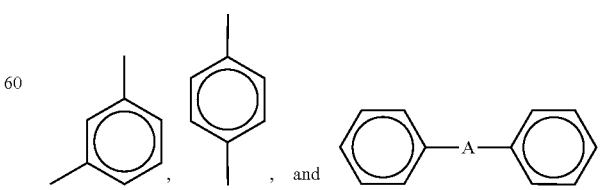

wherein A is a divalent radical, selected from the group consisting of $—SO_2—$, $—CO—$, $—(CH_3)_2—$, $—O—$, $—S—$ and a direct chemical bond. The hydrophobic polymer precursor may further include a tertiary amine. The method of making the hydrophobic aerogel may further include the step of heating the aerogel to form a polyamide-imide aerogel.

In one embodiment, the hydrophobic polymer aerogel used in the method comprises an emulsion polymerized hydrophobic polymer derived from a monomer system that includes at least one monomer chosen from styrene, acrylic acid ester, methacrylic acid ester, vinyl ester, vinyl halide, vinylidene halide and diene.

Hollow microspheres may be added to the dispersion prior to freezing. Alternatively or in addition, clay may be added to the dispersion prior to freezing.

In one aspect, a method of forming an oil absorbing hydrophobic aerogel includes the steps of providing a dispersion that includes a hydrophobic polymer or hydrophobic polymer precursor, and a dispersion medium; freezing the dispersion to solidify the dispersion medium; and freeze drying the dispersion to remove the dispersion medium to form an aerogel.

In the method of forming an oil absorbing hydrophobic aerogel, the hydrophobic polymer precursor may include a polymer material that includes a mixture of amide-amic acid units together with amide-imide units. The dispersion may further include a tertiary amine, wherein the freeze dried aerogel is subsequently heated to drive the imidization reaction between the amic acid moieties and the tertiary amine.

DETAILED DESCRIPTION

Hydrophobic aerogels are provided that are buoyant and have the ability to float on an aqueous solution, for example, but not limited to, water, salt water and sea water. The buoyant aerogels have the ability to absorb hydrophobic liquids and in particular, the hydrophobic aerogels have the ability to separate oil from oil-and-water mixtures. The aerogels are particularly useful for oil spill recovery or contamination rectification. Hydrophobic aerogels absorb and retain hydrophobic liquid, while not absorbing substantial amounts of an aqueous mixture, allowing for sufficient recovery of hydrophobic liquid.

Hydrophobic aerogels may be derived from a composition that includes at least one hydrophobic polymer or a hydrophobic polymer derivative and a solvent or dispersion medium, herein after referred to as dispersion medium.

An aerogel is a porous solid that is formed from a gel, in which the liquid that fills the pores of the solid has been replaced with a gas. Aerogels are generally produced by drying the gel either by a supercritical drying or by freeze drying. Shrinkage of the gel's solid network during drying is negligible or all-together prevented due in part to the minimization of capillary forces acting on the network as the liquid is expended.

Aerogels are generally characterized as having high porosity (about 94-98%), and high specific surface area. Aerogels also possess relatively low densities, generally in the range of 0.004-0.5 g/cm$^3$. Aerogels can possess excellent load bearing properties and insulation properties, and may be used as a catalyst or in connection with a catalytic process (e.g., as a catalyst support structure).

As described herein, highly porous, aerogel like structures that include a three-dimensional, open-cell body may be formed using two-phase systems, including dispersions, emulsions, solutions, suspensions and latexes. A first phase, for example a polymer or polymer precursor, is dispersed, suspended or emulsified in a second phase, referred to herein as a dispersion medium, to form the two phase system, referred to herein as a dispersion. The dispersion is first subjected to freezing to solidify the dispersion medium, and then freeze dried to remove the bulk of the dispersion medium, leaving behind a solid, polymer containing skeleton of the dispersion. While these highly porous structures are not formed from a gel, the term "aerogel" as used herein includes these dispersion derived structures.

In a preferred embodiment, the hydrophobic aerogel is formed from a polyamide-amic acid aerogel intermediate that is converted into the hydrophobic polyamide-imide form by curing at an elevated temperature with a tertiary amine. The polyamide-amic acid aerogel intermediate is formed by freeze-drying an aqueous solution of the polyamide-amic acid. To form the aqueous solution of the polyamide-amic acid, the solid resin may be dispersed or dissolved in a mixture that includes water and an aliphatic amine, preferably a tertiary amine.

Combining the solid polyamide-amic acid resin with an amount of a suitable amine effective to substantially neutralize the amic acid functionality and form the corresponding amine salt may suffice to dissolve the polyamide-amic acid. Aqueous compositions comprising polyamic acids and containing greater than 100% of the stoichiometric or neutralizing amount of amine, more particularly from about 110% to about 150%, based on the amount of amic acid groups present in the polymer, are markedly more stable toward hydrolysis, hence formulations based on polyamide-amic acids comprising similarly high levels of amine will be preferred. Aqueous polyamide-amic acid compositions that contain an amount of tertiary amine substantially in excess of the stoichiometric amount, most preferably from 150% of the stoichiometric amount to as much as a 5-fold excess, will be more preferred, and still greater levels of amine may be conveniently employed without detrimentally affecting the coating properties of the polyamide-amic acid resin. In addition to improving the solution stability of these compositions, large excesses of the amine may be found to improve the rate of dissolution of the solid resin.

The polyamide-amic acid used may be further described as a polymer material comprising a mixture of amide-amic acid units which may be represented by the following structural formula A:

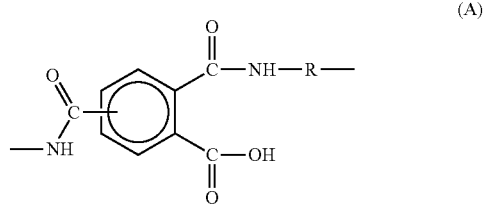

(A)

wherein the attachment of the two amide groups to the aromatic ring as shown will be understood to represent the 1,3 and the 1,4 polyamide-amic acid configurations, together with amide-imide units which may be represented by the following structural formula B:

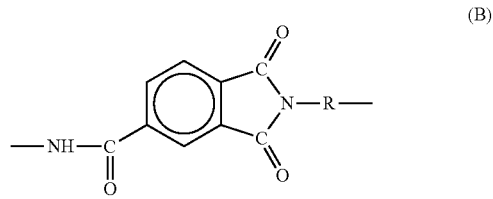

(B)

wherein R in the structure above is the moiety derived from the aromatic diamine component. R may be further described as a substituted or unsubstituted divalent arylene moiety selected from the group consisting of:

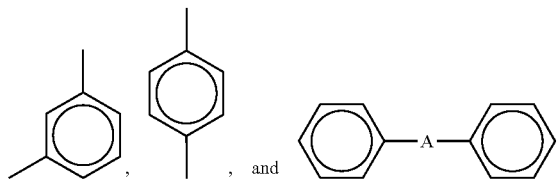

wherein A is a divalent radical, selected, for example, from the group consisting of —$SO_2$—, —CO—, —$C(CH_3)_2$—, —O—, —S— and a direct chemical bond. Aromatic diamines having other linking groups are also known in the art and used as monomers in the production of polyamide-imide resins, and most will be found suitable for use according to the practice of this invention.

In one embodiment, the aromatic diamine component is 4,4'-methylenedianiline (MDA), units A and B may be more particularly represented by the structural formulae

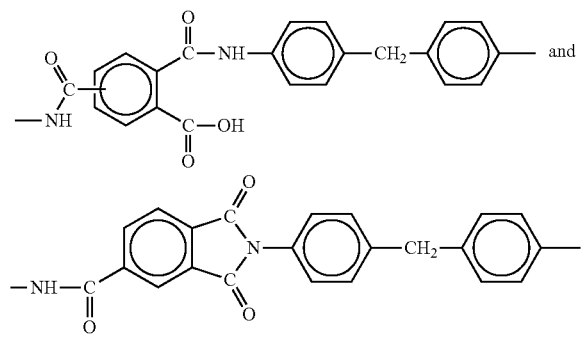

The ratio of A, the amide-amic acid units, to B, the amide-imide units in the polyamide-amic acids used will typically be high, suitably about 20:1 to about 1.01:1, preferably about 18:1 to about 5:1, most preferably about 16:1 to about 8:1. The units A of the polyamide-amic acid thus will suitably comprise more than 50 mole % of the total sum of amide-amic acid units and amide-imide units in the polymer, preferably more than 75 mole % and most preferably more than 90 mole %. Thus, most of the units in the polyamide-amic acid are in the amic acid form, i.e., A above.

The acid number (milligrams of KOH/gram) of the polyamide-amic acid is suitably greater than 100, preferably in the range of from 100, more preferably 110 and still more preferably greater than 120, and may be up to the theoretical acid number for a resin that comprises only A structural units as shown above. The acid number of a fully-washed resin is primarily a function of the amount of amic acid component, unit A, present in the resin, and may be approximated on a theoretical basis as:

$$\text{Theoretical acid no. (mg KOH)} = \frac{(\text{mole fraction of } A \text{ units}) \cdot 56}{\text{MW of } A \text{ units}} \times 100$$

To form an aqueous polyamide-amic acid composition in solution, the solid, substantially organic solvent-free polyamide-amic acid described above is mixed with water in the presence of an amine, for example a tertiary amine. The amine will be selected to be miscible with water and volatile, preferably a low-boiling-point tertiary amine that will be readily volatilized during a thermal treatment to cyclize and cure the polyamide-amic acid. Trialkyl amines having limited water solubility such as tri-n-butylamine may also be found useful, particularly if employed together with a suitable water-miscible co-solvent for the amine, for example isopropanol. Ammonia, as well as water-miscible primary and secondary alkyl amines, may also be effective in dissolving the polyamide-amic acid. However, such amines are generally known to be reactive with amide functional groups and may attack the amide functionality of the polyamide-amic acid, resulting in chain scission; hence these reactive amines will be less preferred.

The tertiary amine may be a tri-($C_1$-$C_4$ alkyl)amine such as, for example, trimethylamine, N,N-dimethylethylamine, N,N-dimethyl propylamine, triethylamine or the like. Cyclic tertiary amines may also be found useful, as may any of the variety of well known, water-miscible, tertiary alkanol amines including N,N'-dimethylethanolamine. Although polyfunctional amines such as N,N'-dimethylpiperidine, as well as N,N,N'N'-tetraalkyl-alkaline diamines and poly-N-alkylated alkalene triamines may also be found effective, the polyfunctional amines may tend to form associative crosslinks and gel, and will be less preferred.

The amount of polyamide-amic acid that will be dissolved in the mixture of water and amine will depend in part upon the intended use. For most purposes, the solution will comprise from about 0.25 to about 15 wt. %, preferably from about 0.5 to about 8 wt. %, and more preferably up to about 5 wt. %, polyamide-amic acid based on combined weight of polyamide-amic acid, water and tertiary amine.

In another embodiment of the present invention, the hydrophobic aerogel is derived from at least one emulsion polymerized hydrophobic polymer. The monomer system employed for the formation of the hydrophobic may include, for example, non-acid functional monomers, and in particular styrenes, such as styrene itself, α-methylstyrene, o-, m- and p-methylstyrene, o-, m- and p-ethylstyrene, p-chlorostyrene and p-bromostyrene; normal and branched acrylic and methacrylic esters of alkanols (typically C1-C12) and cycloalkanols (typically C5-C12) such as methyl methacrylate, ethyl methacrylate, n-butyl methacrylate, t-butyl methacrylate, 2-ethylhexyl methacrylate, isobornyl methacrylate, and cyclohexyl acrylate and the corresponding acrylates; vinyl esters such as vinyl acetate and vinyl alkanoates; vinyl halides such as vinyl chloride; vinylidene halides such as vinylidene chloride; dienes such as 1,3-butadiene and isoprene. A functional monomer(s) for imparting crosslinkability (which is not normally an acid monomer) may optionally be included, examples of which include hydroxy and epoxy functional (meth)acrylates such as hydroxyalkyl (typically C1-C12) methacrylate, e.g. 2-hydroxyethyl methacrylate, glycidyl methacrylate, and the corresponding acrylates, as well as keto- and aldehyde-functional monomers such as acrolein, methacrolein, and methyl vinyl ketone, acetoacetoxy esters of hydroxyalkyl (typically C1-C12) acrylates and methacrylates such as acetoacetoxyethyl acrylate or methacrylate, and also keto or aldehyde-containing amides such as diacetone acrylamide.

Emulsifying agents that can be used for the emulsion polymerization of the hydrophobic polymer are, for example, anionic and/or non-ionic emulsifiers. Anionic emulsifiers include, but are not limited to, alkylethoxylate sulfate and sulfonate, alkylphenolethoxylate sulfate and sulfonate, alkyl-sulfate and sulfonate, alkylethoxylate phosphates, alkylphenol ethoxylate phosphates, alkyl phosphates, alkylaryl sulfonates, sulfosuccinates, and mixtures thereof. Non-ionic surfactants include, but are not limited to, alkylaryl polyether alcohols, alkylphenol ethoxylates, alkyl ethoxylates, ethylene oxide block copolymers, propylene oxide block copolymers, polyethylene oxide sorbitan fatty acid esters, and mixtures thereof. In one embodiment, the amount of emulsifying agent used is between 0.3 to 2% by weight, based on the weight of the total amount of monomer. In another embodiment, the amount of emulsifying agent used is between 0.3 to 1% by weight.

The polymer may be combined and mixed with an aqueous dispersion medium so as to form a suspension, dispersion, emulsion or solution. As used herein, the dispersion medium may be any suitable liquid compound or mixture of compounds that forms a crystalline phase structure when frozen and is sublimable. Examples of dispersion media include, but are not limited to, water, alcohols, such as tert-butanol, acid group containing solvents such as acetic acid, acetonitrile, dimethyl sulfoxide, cyclohexane, benzene, ortho, meta, or para-xylene, or a combination thereof. The dispersion medium may be a solvent that dissolves the polymers, copolymers, monomers, or combination thereof. For example, non-water soluble polymers may be dissolved in a suitable solvent appropriate for the polymer with examples including, but not limited to, alcohol such as methanol, ethanol, propanol, butanol, acid group containing solvents such as formic acid and acetic acid, formamide, acetone, tetrahydrofuran, methyl ethyl ketone, ethyl acetate, acetonitrile, N,N-dimethylformamide, dimethyl sulfoxide, hexane, toluene, benzene, ethers such as diethyl ether, methylene chloride, or carbon tetrachloride, etc.

The polymer may be combined and/or mixed with the dispersion medium in an amount from about 1 to about 40 wt % of the total polymer/dispersion medium mixture. In one embodiment, the polymer is combined and/or mixed with the dispersion medium in an amount from about 0.5 to about 30 wt %. In another embodiment, the polymer is combined and/or mixed with the dispersion medium in an amount from about 1 to about 10 wt %. Higher concentrations of polymer in the solution will generally produce robust structures, but will reduce the porosity and provide for higher densities.

In some embodiments, the hydrophobic polymer aerogel is free of clay. In other embodiments, the hydrophobic polymer aerogel may include one or more clays that are mixed with the polymer and dispersion medium prior to freeze drying. Clay is generally defined as a material containing a hydrated silicate of an element such as aluminum, iron, magnesium, potassium, hydrated alumina, iron oxide, or the like. The silicate layers of such clays are negatively charged, and are separated by layers of positively charged ions, such as sodium, potassium and other elements. While not specifically required for the present invention, naturally-occurring clays can be altered via ion exchange processes, to, for example, replace sodium ions with quaternary ammonium ions and utilized in the present invention. Occasionally, the clay may contain impurities of other naturally occurring minerals and elements that can vary depending on the location where the clay is obtained. The clays of interest for the present invention can be used as mined, or can be purified by methods known to those of ordinary skill in the art of clay product manufacture.

In one embodiment, the clays that may be utilized in the hydrophobic polymer aerogel are capable of being exfoliated or subdivided into individual layers. In another embodiment, the clays that may be utilized in the polymer aerogel are soluble or dispersible in solvents such as water to at least 1-5 wt %. Examples of suitable clays, include, but are not limited to, illite clays such as attapulgite, sepiolite, and allophone; smectite clays such as montmorillonite, bentonite, beidellite, nontronite, hectorite, saponite, and sauconite; kaolin clays such as kaolinite, dickite, nacrite, anauxite, and halloysite-endellite; and synthetic clays such as laponite and fluorohectorite.

When included, the clays may be present in an amount ranging from about 0.25 to about 10 wt % of the total weight of the polymer/dispersion medium/clay mixture. In one embodiment, the clays may be present in amount from about 0.25 to about 5 wt % of the total weight of the polymer/dispersion medium/clay mixture. In another embodiment, the clays may be present in amount from about 0.25 to about 2.5 wt % of the total weight of the polymer/dispersion medium/clay mixture.

U.S. Patent Application Publication Nos. 2007/0208124 and 2008/0132632 are herein incorporated by reference in their entirety and are generally directed to clay aerogel polymer composites. As disclosed therein, the aerogel may be formed from clay and one or more polymers such that the formed aerogel may include about 1 to about 99 wt % of clay. In an embodiment only including polymer and a clay in a dispersant medium, the weight ratio of polymer to clay may range from 1:99 to about 99:1.

Additives useful to modify the properties of the polymer aerogel may also be included in the aerogel polymer composite. For example, additives such as colorants (dyes, pigments), antistatic agents, chemical coupling agents, electrically conductive-fillers including, but not limited to, forms of conductive carbon and metal flakes/particles; and photoactive species including, but not limited to, rare earth ions, may each be incorporated into the aerogel composite structures. In one embodiment, the additives may be included in an amount less than about 1 wt % of the aerogel polymer composite. In another embodiment, the additives may be included in an amount less than about 0.1 wt %.

In one embodiment, buoyant materials, preferably having overall densities of less than 1.0 g/cm$^3$ are added to the dispersion used to form aerogel materials. Examples of buoyant materials include, but are not limited to, hollow microspheres, hollow nanospheres or other hollow structures. The incorporation of hollow spheres brings some challenges as the buoyancy causes the particles to float to the dispersion medium. It has been found that the buoyancy can be counteracted by increasing the viscosity of the aerogel forming dispersion prior to forming the aerogel material or increasing the freeze rate, such that the particles do not travel appreciably before being trapped by the ice, or a combination thereof.

The aerogels in accordance with the present application may be formed by subjecting an aerogel forming mixture (e.g., the mixture of polymer, dispersant medium, and optionally, one or more clays, fillers, additives, etc.) to a freeze drying procedure. The freeze drying procedure causes the liquid component of the dispersion to be removed while leaving the solid structure of the aerogel intact.

In the case of the formation of a polymer aerogel, a polymer, copolymer, monomer, or combination thereof may be combined with a sufficient amount of a dispersion medium to form a mixture. If one or more of additives is to be included in the polymer aerogel, such additives may be combined and/or mixed with the polymer at any period of time prior to addition of the polymer to the dispersion medium, at a time subsequent the combination of the polymer and dispersion medium, or at both times.

The aerogel forming mixture is mixed for a period of time generally until the polymer is suspended or dissolved in the dispersion medium. Mixing may be performed by any suitable means, such as blending and shearing, for any suitable period of time until desired suspension is achieved. For example, the duration of the mixing process may range from about 1 minute to about 120 minutes, and the mixing process may yield a homogeneous or substantially homogenous mixture. In one embodiment, the dispersion medium may be heated to increase solubility of the polymer and/or additives.

The mixture may be poured or otherwise transferred into any desired structure that serves as a mold. Although in some embodiments the aerogel forming mixture may be mixed in the mold.

The aerogel forming mixture is subsequently frozen, for example in a solid carbon dioxide and ethanol bath. In another embodiment, the mixture is frozen utilizing liquid nitrogen, although the liquid nitrogen does not contact the mixture. Generally the dispersion medium forms a crystalline phase when frozen. In general, crystal growth of the dispersion medium will contribute to the formation of the aerogel structure. In one embodiment, the aerogel precursor is subjected to temperatures within the range of about −1° C. to about −196° C. In another embodiment, the aerogel precursor is subjected to temperatures within the range of about −40° C. to about −196° C. In yet another embodiment, the aerogel precursor is subjected to temperatures within the range of about −60° C. to about −100° C. In one embodiment, the aerogel precursor is subjected to temperatures of about −60° C. In another embodiment, the aerogel precursor is subject to temperatures of about −10° C.

In those embodiments where only a polymer is included in the dispersion medium, the binding forces of the polymer will maintain the formed structure. Subsequently, the frozen mixture is dried under vacuum (i.e., freeze-dried) and the dispersion medium is sublimed. The formed aerogel may then removed from the mold.

The aerogel may optionally be oven cured while under vacuum, either prior to or subsequent to the aerogel being removed from the mold. In the curing process, the aerogels may be heated to a temperature ranging from about 150° C. to about 1200° C. for any suitable period of time. The cured aerogel structures have low density, are mechanically resilient, easily handled, and stable to high temperatures of use.

In one embodiment, the aerogel is formed from a polyamide-amic acid aqueous solution that has been frozen and then freeze dried to remove the water. The aerogel is then heated to a temperature from about 150° C. to about 250° C. and preferably from about 200° C. to about 220° C., preferably under vacuum. The post freeze drying heating step is sufficient to drive the imidization reaction. The resulting highly lamellar cured structure is hydrophobic.

An important aspect of the present invention is that the formed hydrophobic aerogels are buoyant and float on an aqueous mixture, such as water. Typical densities of the aerogels are about 0.05 to about 0.2 g/cm$^3$. The buoyant aerogels are utilized to remove oil from water such as by absorbing oil on the surface of water or other aqueous mixture. Aside from maritime oil spills, other used for the hydrophobic aerogels include absorbing spills such as oil from cooling equipment where the aqueous coolant is contaminated by lubricating and machine oils. The oil is washed away by the coolant and ends up collecting at the surface of a holding tank where it builds up. Using the aerogels of the present invention to absorb oil can provide a method for lengthening the amount of time between coolant changes.

Another use for the aerogels of the present invention is for the collection of bio-fuel, such as bio-diesel fuel that is produced in large ponds of algae. The resilient nature of the hydrophobic aerogels allows for the hydrophobic liquid, such as oil, to be squeezed out from the aerogel so that the aerogel can be subsequently reused. A further processing method allows the oil to be evaporated out of the aerogel so that the aerogel can be utilized again, particularly in the case wherein the aerogel polymer is a relatively high temperature polymer.

In addition, the aerogel materials can be formed as membranes with filtration applications and, therefore, can contact or be in operative contact with a support material.

In a preferred embodiment of the present invention, the hydrophobic aerogel can absorb at least 50% of its volume in the hydrophobic liquid, and preferably at least 80% of its volume.

Embodiments of inventive compositions and methods are illustrated in the following examples. These examples are provided for illustrative purposes and are not considered limitations on the scope of inventive compositions and methods.

EXAMPLES

Example 1

A low density, buoyant hydrophobic aerogel is formed by mixing 5 parts by weight of Torlon® AI-30*, a polyamide-amic acid aqueous solution available from Solvay Advanced Polymers, in 100 parts by weight of water. A tertiary amine, diethylamino ethanol, is present in the polyamide-amic acid solution. The polyamide-amic acid solution and water are mixed, and the mixture is then frozen in a solid carbon dioxide and ethanol bath. The frozen composition is dried under vacuum using freeze-drying to sublime the water. After drying, the sample is heated to 200° C. under vacuum for 2 to 24 hours, preferably 2 to 8 hours, to drive the imidization reaction. A highly lamellar, hydrophobic structure is produced by this procedure.

(*Torlon® AI-30 is the water-soluble analog of Torlon® AI-10 and consists of 35% solids, 63% water and 2% NMP. It is made water soluble by forming an ammonium salt with the amic acid groups on the polymer backbone of the polyamide-amic acid.)

Comparative Example A

Using the procedure described in Example 1, an aerogel is produced using 10% by weight epoxy and 2.5% by weight clay.

The aerogels of Example 1 and Comparative Example A were placed on the surface of a mixture of Fisher brand mechanical pump fluid and tap water and allowed to sit until completely saturated, as indicated by a slight darkening in color. The saturated aerogels were then removed and evaluated. The aerogel of Comparative Example A absorbed both water and oil, with the water being absorbed much more quickly than the oil. The oil saturated aerogel of Example 1 was able to retain the absorbed oil when removed from the surface of the oil-and-water mixture, and was able to be transported without loss of oil. When compressed, the saturated aerogel of Example 1 expelled the oil from the structure, allowing partial recovery of the absorbed oil. When placed back onto the surface of the oil-and-water mixture, the aerogel of Example 1 absorbed additional oil.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means")

used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method of forming a hydrophobic aerogel comprising:
providing a dispersion comprising a polymer precursor comprising polyamide-amic acid, and a dispersion medium;
freezing the dispersion to solidify the dispersion medium; and
freeze drying the dispersion to remove the dispersion medium to form a hydrophobic aerogel.

2. The method of claim 1 wherein the polymer precursor comprises a mixture of amide-amic acid units represented by the following structural formula A:

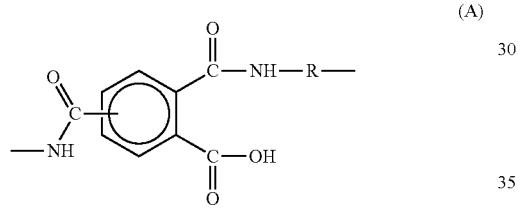

wherein the attachment of the two amide groups to the aromatic ring represent the 1,3 and the 1,4 polyamide-amic acid configurations, together with amide-imide units represented by the following structural formula B:

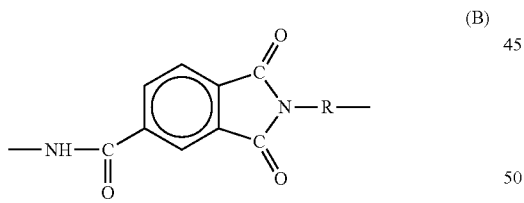

wherein R is a substituted or unsubstituted divalent arylene moiety selected from the group consisting of:

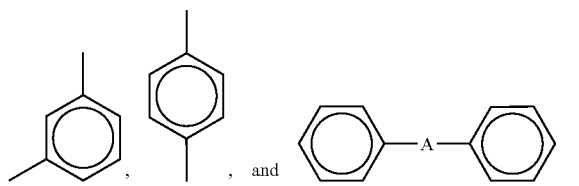

wherein A is a divalent radical, selected from the group consisting of —SO$_2$—, —CO—, —C(CH$_3$)$_2$—, —O—, —S— and a direct chemical bond.

3. The method of claim 2 wherein the polymer precursor further comprises a tertiary amine.

4. The method of claim 3 further comprising the step of heating the hydrophobic aerogel to form a polyamide-imide aerogel.

5. The method of claim 1 wherein the dispersion medium comprises water.

6. The method of claim 1 further comprising adding a plurality of hollow microspheres to the dispersion prior to freezing.

7. The method of claim 1 further comprising adding clay to the dispersion prior to freezing.

8. A method of forming an oil absorbing hydrophobic aerogel comprising:
providing a dispersion comprising a polymer precursor comprising polyamide-amic acid, and a dispersion medium;
freezing the dispersion to solidify the dispersion medium; and
freeze drying the dispersion to remove the dispersion medium to form an oil absorbing hydrophobic aerogel.

9. The method of claim 8 wherein the polymer precursor comprises a mixture of amide-amic acid units represented by the following structural formula A:

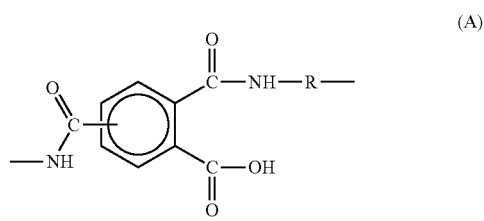

wherein the attachment of the two amide groups to the aromatic ring represent the 1,3 and the 1,4 polyamide-amic acid configurations, together with amide-imide units represented by the following structural formula B:

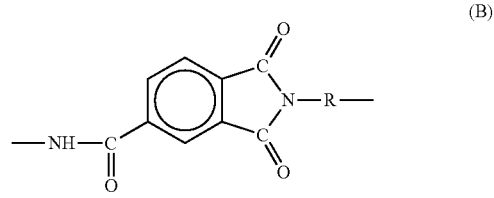

wherein R is a substituted or unsubstituted divalent arylene moiety selected from the group consisting of:

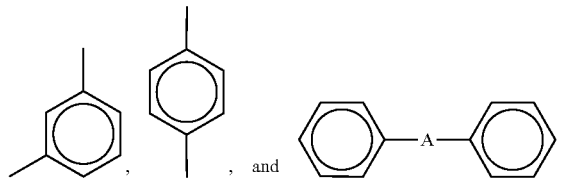

wherein A is a divalent radical, selected from the group consisting of —SO$_2$—, —CO—, —C(CH$_3$)$_2$—, —O—, —S— and a direct chemical bond.

10. The method of claim 8 wherein the polymer precursor further comprises a tertiary amine.

11. The method of claim 10 further comprising the step of heating the hydrophobic aerogel to form a polyamide-imide aerogel.

12. The method of claim 8 wherein the dispersion medium comprises water.

13. The method of claim 8 further comprising adding a plurality of hollow microspheres to the dispersion prior to freezing.

14. The method of claim 8 further comprising adding clay to the dispersion prior to freezing.

\* \* \* \* \*